United States Patent [19]

Mauri et al.

[11] Patent Number: 4,777,094
[45] Date of Patent: Oct. 11, 1988

[54] POLYOLEFINIC FILMS OF IMPROVED IMPERMEABILITY CHARACTERISTICS AND PROCESS FOR THEIR PRODUCTION

[75] Inventors: Luigi Mauri; Rino Cardaio, both of Terni, Italy

[73] Assignee: Moplefan S.p.A., Milan, Italy

[21] Appl. No.: 842,184

[22] Filed: Mar. 21, 1986

[30] Foreign Application Priority Data

Mar. 25, 1985 [IT] Italy ................................ 20052 A/85

[51] Int. Cl.⁴ ........................ B32B 15/08; B32B 27/30; B32B 27/32
[52] U.S. Cl. .................................. 428/463; 427/372.2; 427/384; 427/404; 427/407.1; 428/516; 428/520; 428/522
[58] Field of Search ............... 428/463, 520, 522, 516; 427/372.2, 384, 404, 407.1

[56] References Cited

U.S. PATENT DOCUMENTS 3,524,905 8/1970 Coates ................................. 428/522
3,949,135 4/1976 Vercauteren ...................... 428/522

FOREIGN PATENT DOCUMENTS 0032954 2/1982 Japan .................................. 428/520
0777772 1/1986 Japan .................................. 428/463

Primary Examiner—Ellis P. Robinson
Attorney, Agent, or Firm—Stevens, Davis, Miller & Mosher

[57] ABSTRACT

Polyolefinic films having improved impermeability characteristics to gases and vapors, said films being coated on either one or both its surfaces by a layer of a copolymer containing functional hydroxylic groups, functional acid carboxylic groups and optionally—esteric groups and obtained by hydrolysis of copolymers consisting of an unsaturated ester and of an unsaturated acid or corresponding anhydride.

11 Claims, No Drawings

POLYOLEFINIC FILMS OF IMPROVED IMPERMEABILITY CHARACTERISTICS AND PROCESS FOR THEIR PRODUCTION

The present invention concerns polyolefinic films showing improved characteristics of impermeability to gases and vapors, and the process for their preparation.

More particularly, the present invention relates to polyolefinic films having improved characteristics of impermeability to gases and vapors that are slippery and free of blocking, particularly suited for the manufacture of containers, small envelopes, small bags, vessels and manufactured articles in general prevailingly intended for the packing industry.

BACKGROUND OF THE INVENTION

From previous patents and applications originating with our group, there are known and have been described films obtained from alpha-olefin polymers of a prevailingly isotactic structure; more particularly obtained from polypropylene consisting essentially of isotactic macromolecules and prepared with stereospecific catalysts.

The mechanical, protective and optical characteristics of such films, and in particular of polypropylene films, are such as to make them particularly suited to be used in the packaging field.

The impermeability of said films to gases and vapors may not be as high as required for some applications such as, for example, the packaging of certain foodstuffs which require a particularly high impermeability.

With the aim of improving the impermeability to gases and vapors and the flavors of the olefinic films, it is a usual technique to coat said films with suitable materials.

Generally, the coating is achieved by extrusion of a lacquer onto the carrier film in the molten state (extrusion coating); by "lamination" of two films to each other, with or without interposed adhesive substances; or by spreading the coating substance dissolved in a suitable solvent, possibly together with a primer that will facilitate the adhesion of the coating to the carrier. Often, the primer or "anchoring agent", is substituted or is accompanied by a pre-treatment of the supporting film with chemical agents, with non-piercing electrical discharges, with flame or the like.

As materials suitable for the coating of the polyolefinic films there have been described and suggested numerous compounds, prevailingly polymeric compounds, which in general, are applied in the form of solutions in organic solvents. The use of organic solvents, which subsequently are removed from the coated film by evaporation, make it necessary to install apparatuses for the recovery of the solvents, and devices keeping the work places free of vapors. Moreover, it is necessary to use new measures for preventing the pollution of the surrounding atmosphere as well as the pollution of the wash water.

There have been suggested polymeric coating materials that may be applied to the films in the form of aqueous dispersions.

The possibility of applying the coating to polyolefinic films from aqueous solutions or dispersions allows to attain a substantial saving on the process, both because no complex and expensive equipment is required for the recovery of the solvents and for the solution of problems connected with the environmental hygiene and pollution, and because it makes the process less complex.

The films coated with the known water-soluble or water-dispersible polymeric materials have, however, little or unsatisfactory impermeability to gases, vapors and flavors, so that they are not suited for the packaging of foodstuffs.

THE PRESENT INVENTION

An object of the present invention is to provide a coating agent for polyolefinic films that, besides being suited for application in the form of aqueous solutions or dispersions, will serve as a barrier against gases, vapors and flavors on the coated film.

It has now been found that coating agents displaying the above listed requisites are copolymers containing hydroxylic and carboxylic functional groups and optionally esteric functional groups, which are obtained by either a partial or complete hydrolysis of the copolymer consisting of an unsaturated ester and of an unsaturated acid or corresponding anhydride.

Thus, according to this invention polyolefinic films are coated on either one or both surfaces with a copolymer containing hydroxylic and carboxylic functional groups and, optionally, functional esteric groups, which is obtained by either a partial or complete hydrolysis of the copolymer consisting of an unsaturated ester and of an unsaturated acid or corresponding anhydride.

The copolymer, consisting of an unsaturated ester and of an unsaturated acid, may be chosen from a wide range of products, such as vinyl-acetate, vinylstearate and similar vinyl-esters and acrylic, methacrylic, maleic, fumaric, crotonic acid and the like, as well as the corresponding anhydrides of said unsaturated acids.

The proportions of the monomers that may be used for producing the copolymer may vary and, in general, is comprised between 95% and 50% by weight of a vinyl ester, and correspondingly from 5% to 50% by weight of an unsaturated acid.

The hydrolysis of the unsaturated ester/unsaturated acid copolymer is carried out according to known processes, either in water or in organic solvents, operating in the presence of organic or inorganic acids, such as, for instance: hydrogen chloride, sulphuric, benzolsulphonic, toluenesulphonic acids; of ion-exchange resins containing sulphonic or phosphonic groups and the like; or in the presence of organic or inorganic bases such as sodium, potassium, calcium, and ammonium hydrates; sodium methylate—or in the presence of ion-exchanging resins containing basic functional groups.

Before applying the coating agent to the film, the surface of said film will be treated in order to ensure a perfect and strong adherence so as to avoid "peeling" phenomena. This treatment may be carried out according to known techniques, either by means of electrical discharges, by flame or by chemical oxidation.

The coating agent may also be applied on doubly stretched films, unstretched or stretched in only one direction.

In the applications wherein a stronger adherence of the coating to the film is desired, i.e., stronger than the adherence obtainable with the surface treatment of the film by one of the above-cited methods, there may be used an intermediate layer of a primer, in order to increase the adherence of the coating composition of the present invention to the film.

In this case, the surface of the film is first treated with one of the above-reported methods, the electronic treatment being the preferred one and, subsequently a continuous primer coating is applied on the thus treated film surface.

The "primer" is well known to the skilled in the art and geneally consists of polyethyleneimine.

Said primer is applied to the carrier film in the form of a solution by using conventional coating techniques, such as, for instance, by using a conventional spreading machine for thin sheets.

The coating agent is applied in the form of an aqueous solution or dispersion, according to known methods such as, for instance: spreading, immersion (dipping), spraying or the like.

The excess solution or dispersion may be removed by squeezing between rollers or by means of the roto-system or "reverse" system with dosing bar.

The thickness of the applied coating shall be such as to impart to the coated film the desired properties of impermeability to gases, vapors and flavors as well as the required slippiness.

Total thicknesses of the coatings are preferably comprised between 1 and 20 microns.

In the case an anti-adhesion agent is required, generally known as an anti-blocking agent, the copolymer of the coating may be additioned with such an agent in order to prevent the tendency of the film to adhere to itself when two or more surfaces of the film itself are kept pressed to each other like, for instance, in the case of film rolls.

Suitable anti-blocking agents may be waxes or wax-like materials that melt at temperatures greater than the stocking temperature and which are not soluble in the coating agent at such temperatures.

Specific examples of such anti-blocking agents are the natural waxes such as paraffin wax, microcrystalline wax, carnauba wax, Japanese wax, mounting wax, etc., and the synthetic waxes such as hydrogenated castor oil, chlorinated hydrocarbon waxes, amides of long-chained fatty acids, etc.

The films onto which the coatings of the present invention are applied are obtained by extruding olefinic polymers prepared with stereospecific catalysts, in particular polypropylene essentially constituted of isotactic macromolecules, crystalline propylene/ethylene copolymers both of the random a well as block type, polyethylene and mixtures thereof.

Before the film-forming step, the polymer may be additioned with additives such as stabilizers, lubricants, dyestuffs, anti-static agents, plasticizing fillers, etc.

After the extrusion, carried out according to the techniques known to the art, the film is possibly heated and oriented by stretching in either one or both directions and, after having been subjected to surface treatments as described above, is then coated with the coating composition of this invention.

The polyolefinic films coated with aqueous dispersions according to this invention display excellent adhesion, a high impermeability to gases, vapors and flavors, good optical characteristics and a good slipperiness.

The coated films of this invention are used as components of laminates and coupled materials, or they are further coated with a lacquer or a protective waterproof layer.

These films may likewise be coated, before their use in the preparation of laminates and coupled materials, with a metallic layer, in particular aluminum, applied by under-vacuum metallization, which further improves the resistance of the films to gases, vapors and flavors.

For the evaluation of the characteristics of the coated films object of the present invention the following factors are taken into consideration:

the degree of adhesion of the coating to the supporting film (scotch-tape test), measured by subjecting to pressure a strip of cellulosic adhesive tape put into contact with the surface of the coated film and then by tearing away immediately the cellulosic tape from said film surface. The coatings with a good adhesion must remain firmly attached to the supporting film; the coating with a poor or bad adhesion is either partially or totally removed from the supporting film;

the degree of impermeability to gases, vapors and flavors, determined by measuring the permeability to oxygen according to ASTM-E-96 standards.

The following examples are given to illustrate the invention and are not intended to be limiting.

EXAMPLE 1

Into a Pyrex glass flask of 2 lt holding capacity, fitted with a stirrer, a thermometer, a reflux-cooler and a loading funnel, there were introduced at room temperature:

methanol: 125 ml;
vinyl acetate/crotonic acid (90/10) copolymer: 25 g; and
a methanolic solution of sodium methanolate: 70 ml containing dissolved 24 g of sodium methanolate.

After 5 minutes, a yellowish mass separates, which consists of the product of the hydrolysis ofthe copolymer, and which is separated and purified by means of repeated dissolutions in water and precipitations with a 50/50% by volume ethanol/ethylacetate mixture.

The copolymer, after drying at 50° C. under vacuum, shows the following analysis results:
hydroxylic groups: 31.7%
carboxylic groups: 9.3%
esteric groups: absent
viscosity (in 15% aqueous solutions): 70 cps.

EXAMPLE 2

Operating under the same conditions and with same quantitites as in Example 1, a vinyl-acetate/maleic anhydride copolymer in a 50/50 by weight ratio, was hydrolized.

The hydrolized copolymer, after drying at 50° C. under vacuum, showed the following analysis results:
hydroxylic groups: 11.7%
carboxylic groups: 54.1%
esteric groups: absent
viscosity (in 15% aqueous solutions): 110 cps.

EXAMPLE 3

Operating under the same conditions as in Example 1, a vinyl-stearate/acrylic acid copolymer in a 85/15 by weight composition, was hydrolized.

The hydrolized copolymer, after drying under vacuum at 50° C, showed the following analysis results:
hydroxylic groups: 17.2%
carboxylic groups: 34.5%
esteric groups: absent
viscosity (in 15% aqueous solutions): 85 cps.

EXAMPLE 4

Operating under the same conditions and with the same quantities as in Example 1, a vinyl-acetate/crotonic acid copolymer in a 90/10 by weight composition was hydrolized.

The hydrolized copolymer, after drying under vacuum at 50° C., showed the following analysis results:
hydroxylic groups: 17.3%
carboxylic groups: 5.1%
esteric groups: 22.9%
viscosity (in 15% aqueous solutions): 145 cps.

EXAMPLES 5 TO 8

A polypropylenic film, obtained by extruding a polypropylene with an intrinsic viscosity of 2.6, a residue of the extraction with heptane of 98.2%, ashes 45 p.p.m., and having, after stretching, a thickness of 25 microns, was subjected to electronic treatment with a SCAE type device, and successively coated on one of its faces, by means of a common spreading machine, with a 1% aqueous solution of polyethyleneimine.

The film was then dried in an oven and coated with a second layer consisting of one of the copolymers prepared according to the process followed in Examples 1–4 and containing both hydroxylic and carboxylic functional groups.

This copolymer is applied from 15% aqueous solutions. After coating, the thus coated film was dried at 110° C. and displayed the characteristics reported in the following table.

The same film coated on the lacquered face with a layer of 0.03 micron of aluminum, by metallization under vacuum, shows a permeability to oxygen as recorded in the table.

95% to 50% of an unsaturated ester and from 5% to 50% of an unsaturated acid.

2. A polyolefinic film according to claim 1, the coating of which also includes esteric functional groups.

3. A polyolefinic film according to claim 1, in which the copolymer also contains esteric functional groups.

4. A polyolefinic film according to claims 1 or 2, characterised in that the copolymer is selected from the group consisting of copolymers of vinyl-acetate and vinyl-stearate with an unsaturated acid.

5. A polyolefinic film according to claim 4, characterized in that the unsaturated acid is selected from the group consisting of acrylic acid, methacrylic acid, maleic acid, fumaric acid, crotonic acid and the corresponding anhydrides.

6. A polyolefinic film according to claim 5, characterized in that the unsaturated acid is derived from the corresponding anhydrides of said acids.

7. A film according to claims 1 or 2, characterized in that said films are coated with a metallic layer.

8. A film according to claim 7, characterized in that the metallic layer is aluminum.

9. A polyolefinic film according to claims 1 or 2, characterized in that said film is made of polypropylene consisting essentially of isotactic macromolecules, and obtained by a stereospecific polymerization of propylene.

10. A process for preparing a polyolefinic film according to claims 1 or 2, which process comprises coating at least one surface of said film, with an aqueous solution or dispersion of a copolymer containing hydroxylic and carboxylic functional groups, and drying said coating.

11. The process of claim 10 in which the film is coated with an aqueous solution or dispersion of a copolymer containing hydroxylic, carboxylic and esteric functional groups.

TABLE

| COPOLYMER EXAMPLE NO. | COATING THICKNESS IN MICRONS | ADHESION | TRANSPARENCY | PERMEABILITY TO OXYGEN IN ML/MQ 24 H ATM. | |
|---|---|---|---|---|---|
| | | | | BEFORE METALLIZATION | AFTER METALLIZATION |
| 1 | 0.6 | Good | Good | 5 | 0.6 |
| 2 | 0.6 | Good | Good | 39 | 5 |
| 3 | 0.6 | Good | Good | 10 | 2 |
| 4 | 0.6 | Good | Good | 12 | 1.6 |
| 1 not hydrolized* | 0.6 | Good | Good | 1,500 | 270 |
| 2 not hydrolized* | 0.6 | Good | Good | 1,550 | 250 |
| 3 not hydrolized* | 0.6 | Good | Good | 1,480 | 230 |

*Comparative examples.

What we claim is:

1. A polyolefinic film having improved impermeability to gases, vapors and flavors, coated on at least one surface thereof with a coating agent, characterized in that said coating agent is a copolymer containaign hydroxylic and carboxylic groups that is obtained by either a partial or a total hydrolysis of the corresponding copolymer that consists of an unsaturated ester and of an unsaturated acid, said copolymer containing from

* * * * *